(12) United States Patent
Shanson et al.

(10) Patent No.: US 11,166,055 B2
(45) Date of Patent: Nov. 2, 2021

(54) FAST VIDEO STREAM STARTUP

(71) Applicant: VIACOM INTERNATIONAL INC., New York, NY (US)

(72) Inventors: Spencer Shanson, Los Angeles, CA (US); Matt Tretin, Los Angeles, CA (US); Ivan Zubok, Los Angeles, CA (US); Pavlo Kalmykov, Los Angeles, CA (US); Edwin Rodriguez, Los Angeles, CA (US)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

(21) Appl. No.: 16/836,700

(22) Filed: Mar. 31, 2020

(65) Prior Publication Data
US 2021/0306685 A1 Sep. 30, 2021

(51) Int. Cl.
*H04N 21/234* (2011.01)
*H04N 21/2187* (2011.01)
*H04N 21/262* (2011.01)
*H04N 21/81* (2011.01)

(52) U.S. Cl.
CPC ... *H04N 21/23424* (2013.01); *H04N 21/2187* (2013.01); *H04N 21/26258* (2013.01); *H04N 21/812* (2013.01)

(58) Field of Classification Search
CPC .............................................. H04N 21/23424
See application file for complete search history.

(56) References Cited

U.S. PATENT DOCUMENTS

| 8,806,017 | B1* | 8/2014 | Perrow | G06Q 30/0256 709/226 |
| 2014/0344852 | A1 | 11/2014 | Reisner et al. | |
| 2015/0163558 | A1* | 6/2015 | Wheatley | H04N 21/6587 725/12 |
| 2016/0294909 | A1* | 10/2016 | Killick | H04W 4/21 |
| 2017/0041372 | A1 | 2/2017 | Hosur | |
| 2018/0367847 | A1 | 12/2018 | Brinkley et al. | |

OTHER PUBLICATIONS

Rayburn, "The Challenges of Server Side Ad Insertion and Why they're Worth It", https://www.streamingmediablog.com, Sep. 10, 2018, pp. 1-6.
Wagenaar et al., "Unified Remix: a Server Side Solution for Adaptative Bit-Rate Streaming with Inserted and Edited Media Content", In proceedings of MMSys'17, Taipei, Taiwan, Jun. 20-23, 2017, pp. 221-224.

* cited by examiner

*Primary Examiner* — Michael H Hong
(74) *Attorney, Agent, or Firm* — Fay Kaplun & Marcin, LLP

(57) ABSTRACT

The exemplary embodiments relate to devices, systems and methods for a streaming service to provide fast video stream startup at a user device. The streaming service may determine that a video stream for on-demand content is to be provided to the user device and is to include multiple subclips corresponding to the on-demand content and a dynamic content insertion opportunity (DCIO). A first set of multimedia data is transmitted to the user device that corresponds to a first subclip of the on-demand content. When a predetermined condition corresponding to the DCIO is satisfied, a second set of multimedia data is transmitted to the user device that includes multimedia data corresponding to at least the multiple subclips.

18 Claims, 4 Drawing Sheets

FAST VIDEO STREAM STARTUP

BACKGROUND INFORMATION

A streaming service may allow a user to access content on demand via a user device. To generate revenue, the streaming service may provide a video stream that incorporates video advertisements into the selected content.

Video stream startup generally refers to the duration of time between when content is selected at the user device and when playback begins at the user device. Under conventional circumstances, processes performed on the streaming service side may cause an unreasonably long video stream startup at the user device. For example, in accordance with certain streaming protocols, the process of selecting and incorporating video advertisements into the video stream is performed before playback of the video stream begins. If this process causes the video stream startup to take an unreasonable amount of time, the user may cancel the video stream and a revenue generating opportunity is lost.

SUMMARY

Some exemplary embodiments include a method performed at a streaming service. The streaming service determines that a video stream is to be provided to a user device. The video stream corresponds to video content selected by the user device that is available on-demand. The video stream is to include multiple subclips corresponding to the selected content and a dynamic content insertion opportunity (DCIO). A first set of multimedia data is transmitted to the user device. The first set of multimedia data corresponds to a first subclip of the selected content. The streaming service determines whether a predetermined condition corresponding to the DCIO is satisfied. When the predetermined condition is satisfied, the streaming service transmits a second set of multimedia data to the user device. The second set includes multimedia data corresponding to at least the multiple subclips.

Other exemplary embodiments include a server with a communication interface configured to provide a video stream to a user device and a processor configured to perform operations. The operations include, determining that a video stream is to be provided to the user device. The video stream corresponds to video content selected by the user device that is available on-demand. The video stream is configured to include multiple subclips corresponding to the selected content and a dynamic content insertion opportunity (DCIO). A first set of multimedia data is transmitted to the user device. The first set of multimedia data corresponds to a first subclip of the selected content. When a predetermined condition corresponding to the DCIO is satisfied, a second set of multimedia data is transmitted to the user device. The second set includes at least multimedia data corresponding to the multiple subclips.

Still further exemplary embodiments include a non-transitory computer readable storage medium including a set of instructions executable by a processor, when executed the set of the instructions cause the processor to perform operations. The operations include determining that a video stream is to be provided to a user device. The video stream corresponds to video content selected by the user device that is available on-demand. The video stream is configured to include multiple subclips corresponding to the selected content and a dynamic content insertion opportunity (DCIO). A first set of multimedia data is transmitted to the user device. The first set of multimedia data corresponds to a first subclip of the selected content. When a predetermined condition corresponding to the DCIO is satisfied, a second set of multimedia data is transmitted to the user device. The second set of includes at least multimedia data corresponding to the multiple subclips.

DETAILED DESCRIPTION

Figure 1:
FIG. 1 illustrates a representation of a video stream including multiple dynamic content insertion opportunities (DCIOs) according to various exemplary embodiments.
Figure 1:
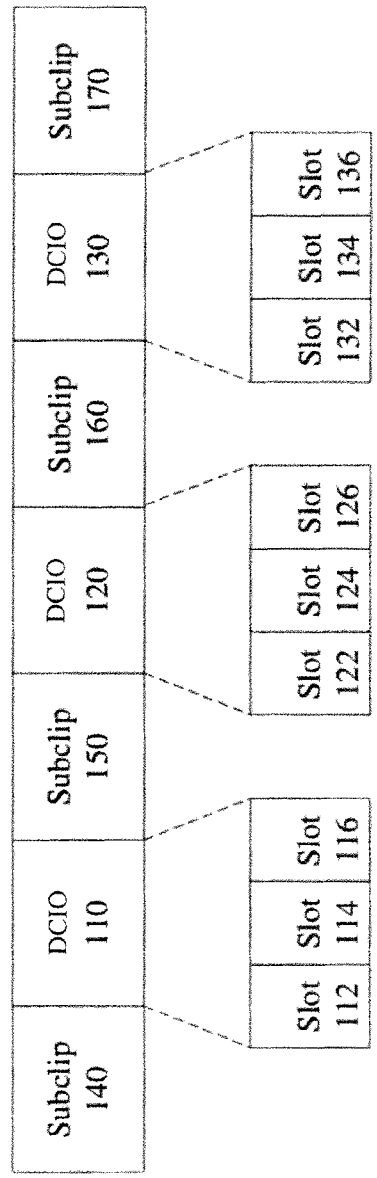

The exemplary embodiments may be further understood with reference to the following description and the related appended drawings, wherein like elements are provided with the same reference numerals. The exemplary embodiments describe devices, systems and methods for a streaming service to provide fast video stream startup at a user device. As will be described in more detail below, the exemplary embodiments relate to how a streaming service provides a video stream to a user device and ensures that the time duration between when the user selects a video stream and when playback begins is kept to a minimum.

The exemplary embodiments are described with regard to a streaming service providing a video stream to a user device. Throughout this description, the video stream may be characterized as a video-on-demand (VOD) stream. The term "VOD stream" may refer to a video stream that includes content that is selected by the user and provided to the user device in response to the selection. For example, user input at the user device may indicate to the streaming service that the user has requested to watch a particular program. In response, the streaming service may provide a video stream of the selected program to the user device. As mentioned above, the exemplary embodiments relate to operations performed by the streaming service to ensure that video stream startup is kept to a minimum. Within the context of this example, the video stream startup refers to the duration of time between when the user selects the particular program and when playback of the particular program begins.

The exemplary embodiments are also described with regard to the video stream including at least one dynamic content insertion opportunity (DCIO). Throughout this description, the term "DCIO" refers to one or more slots that are to be included in a video stream and may be filled with any type of dynamic content. For example, the DCIO may be configured to include dynamic content such as, but not limited to, a highlight, a deleted scene, an interview, a news segment, an advertisement, one or more black frames or any other type of content. The scope of the term "dynamic content" is used herein to differentiate between the content that is to be inserted into the DCIO and the content selected by the user (e.g., the VOD program). Each slot of the DCIO may be configured to include one or more types of dynamic content or a single type of dynamic content may occupy more than one slot. However, any reference to dynamic content as a particular type of content is not intended to limit the scope of the term dynamic content and is merely used as an example. Further, any reference to the video stream being a VOD stream or the video stream including a particular number of DCIOs is merely for illustrative purposes, different entities may refer to similar concepts by different names.

Under conventional circumstances, the streaming service selects dynamic content (e.g., video advertisements, etc.) for each DCIO and inserts the selected dynamic content into the video stream before playback at the user device begins. This process may be performed to satisfy the requirements of the streaming protocol utilized by the streaming service to deliver the video stream to the user device. For example, protocols such as HTTP live streaming (HLS) protocol, dynamic adaptive streaming over HTTP (DASH), Adobe flash streaming, smooth streaming and MP4 faststart may require that the program content and the dynamic content are known when the VOD stream starts. As a result, before playback of the VOD stream can begin at the user device, the streaming service may have to select and insert dynamic content in between the program content. The longer this process takes, the longer the duration between when the selection of the program occurs and when may playback begin (e.g., video stream startup). As mentioned above, an unreasonably long video stream startup creates a negative user experience.

The exemplary embodiments relate to a mechanism that ensures that the video stream startup time is kept to a minimum. Some embodiments will be described as satisfying the HLS protocol. However, the exemplary embodiments are not limited to the HLS protocol and may apply to other protocols such as, but not limited to, DASH, adobe flash streaming, smooth streaming, MP4 faststart, etc. Those skilled in the art will understand that the exemplary concepts described herein may be applicable to any scenario in which a server provides a video stream to a remote endpoint over one or more network connections. The exemplary embodiments may be used in conjunction with other currently implemented video streaming techniques, future implementations of video streaming techniques or independently from other video streaming techniques.

FIG. 1 illustrates a representation of a video stream 102 including multiple DCIOs 110, 120, 130 according to various exemplary embodiments. In this example, the video stream 102 represents a VOD presentation of a particular program with ads. However, any reference to the video stream 102 possessing any particular characteristic is merely provided for illustrative purposes. The video stream 102 is not intended to limit the exemplary embodiments in any way and is only intended to provide a general example of the relationship between a slot, a DCIO and the video stream.

The video stream 102 includes four subclips 140, 150, 160, 170. Each subclip 140, 150, 160, 170 may include multimedia data corresponding to the same program (e.g., movie, show, clips, etc.) or a different program. The video stream 102 further includes a first DCIO 110, a second DCIO 120 and a third DCIO 130. Reference to three DCIOs 110, 120, 130 and four subclips 140, 150, 160, 170 is only provided for illustrative purposes. An actual video stream may include any combination of program content and DCIOs.

The DCIO 110 includes three slots, 112, 114, 116 and each slot 112, 114, 116 may be configured to include one or more instances of dynamic content. However, in some configurations, a single instance of dynamic content may be configured to occupy more than one slot. The duration of the DCIO 110 may be predetermined and the total duration of the one or more video instances of dynamic content may not exceed the duration of the DCIO 110. Reference to the DCIO 110 including three slots, 112, 114, 116 is only provided for illustrative purposes. An actual DCIO may include any number of slots.

Similarly, the DCIO 120 includes three slots 122, 124, 126 and the DCIO 130 includes three slots 132, 134, 135. Like the DCIO 110, the duration of the DCIOs 120, 130 may be predetermined and the total duration of the one or more instances of dynamic content may not exceed the duration of their respective DCIO. As mentioned above, an actual DCIO may include any number of slots.

Figure 2:
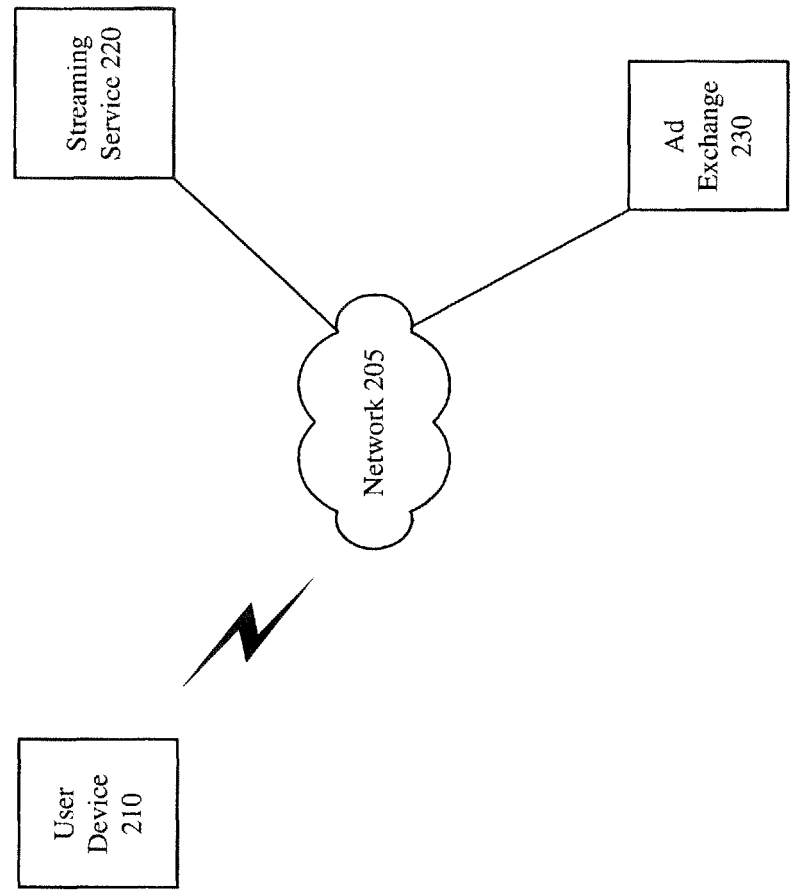
FIG. 2 shows an exemplary arrangement according to various exemplary embodiments.

FIG. 2 shows an exemplary arrangement 200 according to various exemplary embodiments. The arrangement 200 includes a network 205, a user device 210, a streaming service 220 and an ad exchange 230. The exemplary arrangement 200 will be described with regard to the video stream 102 of FIG. 1. However, reference to the video stream 102 is not intended to limit the exemplary embodiments in any way. Instead, the video stream 102 is only referenced to provide a general example of a video stream that may be provided from the streaming service 220 to the user device 210. Those skilled in the art would understand that the exemplary embodiments may apply to a video stream possessing any combination of appropriate characteristics.

As will be described in more detail below, the exemplary embodiments may relate to a scenario in which the user device 210 establishes a connection to the streaming service 220 via the network 205. The streaming service 220 is configured to provide the video stream 102 to the user device 210. The streaming service 220 may communicate with the ad exchange 230 to fill the slots 112-116, 122-126, 132-136 of the DCIOs 110, 120, 130 with paid advertising content. The ad exchange 230 may provide video advertisements that are to be included in one or more of the slots 112-116, 122-126, 132-136 of the DCIOs 110, 120, 130 from the video stream 102.

Those skilled in the art will understand that the user device 210 may be any type of electronic component that is configured to communicate via a network, e.g., a mobile phone, a tablet computer, a smartphone, a laptop computer, a desktop computer, a set top box, a multimedia receiver, a smart TV, a game console, a wearable device, an Internet of things (IoT) device, etc. Thus, the user device 210 may represent any electronic device equipped with hardware, software and/or firmware configured to receive a video stream and directly or indirectly generate video/audio output based on the multimedia data included in the video stream. Reference to a single user device 210 in the arrangement 200 is only for illustrative purposes, an actual arrangement may include any number of user devices being used by any number of users.

The network 205 may represent one or more networks. The user device 210, the streaming service 220 and the ad exchange 230 may each connect to the network 205 wirelessly or using a wired connection. Those skilled in the art will understand the procedures and protocols that may be implemented for each of the user device 210, the streaming service 220 and the ad exchange 230 to connect to the network 205 and communicate with a remote endpoint via the network connection.

In the example of FIG. 2, the streaming service 220 and the ad exchange 230 are shown as having a wired connection to the network 205 and the user device 210 is shown as having a wireless connection. It should be understood that each of the components 210-230 may connect in any manner to the network 205. In addition, the network 205 may represent one or more networks. For example, the entity providing the streaming service 220 may have an internal network (e.g., LAN) that connects to the public Internet to provide the streaming service 220. Thus, it should be understood that network 205 may represent any manner and/or network used to connect the various components or arrangement 200.

The user device 210 may be equipped with a video player that is configured to generate video and/or audio output based on, at least in part, multimedia data received from the streaming service 220. In some embodiments, the user device 210 may access the streaming service 220 via a user-facing application. In other embodiments, the user device 210 may access the streaming service 220 via a web browser. However, any reference to the user device 210 accessing the streaming service 220 in any particular manner is only provided for illustrative purposes. The exemplary embodiments may apply to the user device 210 accessing the streaming service 220 in any appropriate manner.

The streaming service 220 may provide multiple programs available on demand. The streaming service 220 may utilize various hardware, software and/or firmware components to provide video streams to connected user devices. For example, the streaming service may be comprised of one or more servers. Each server may include a processor configured to perform various operations on behalf of the streaming service 220. However, reference to a processor is merely for illustrative purposes. The operations performed by each server may also be represented as a separate incorporated component of the server or may be a modular component coupled to the server, e.g., an integrated circuit with or without firmware. For example, the integrated circuit may include input circuitry to receive signals and processing circuitry to process the signals and other information. In addition, in some servers, the functionality of the processor is split among two or more processors. In some embodiments, the functionality described for the server may include a cloud implementation such as a set of virtual or hardware servers hosting firmware. The exemplary embodiments may be implemented in any of these or other configurations of a server.

The streaming service 220 may also include one or more databases that are directly or indirectly accessible by the one or more servers. For example, the streaming service 220 may use a database to store multimedia data that is to be included in a VOD stream and a database for storing dynamic content that is to be included in a DCIO. These databases may be implemented using hardware, software and/or firmware of a single device (e.g., server) or may be implemented using hardware, software and/or firmware from multiple devices. In some embodiments, the functionality described for the databases may include a cloud implementation such as a set of virtual or hardware servers hosting firmware. The exemplary embodiments may be implemented in any of these or other configurations of a database. Those skilled in the art will understand that the exemplary concepts described herein may be applicable to any scenario in which a server provides a video stream to a remote endpoint over one or more network connections.

The streaming service 220 may further include one or more communication interfaces configured to facilitate communication with connected user devices, with the network 205, with the ad exchange 230 and between hardware, software and/or firmware components included within the streaming service 220.

The ad exchange 230 may represent a platform that enables advertisers to purchase on available slots. To provide an example, the streaming service 220 may determine that the user device 210 is associated with a set of parameters. The parameters may include but are not limited to, a location of the user device 210, the type of device, demographic information for the user of the user device 210, etc. The streaming service 220 may then indicate to the ad exchange 230 that slots 112-116, 122-126, 132-136 for the video stream 102 that is to be provided to the user device 210 are available for purchase. Advertisers may purchase slots based on, at least in part, the parameters associated with the user device 210 that is to receive the corresponding video stream 102. An advertiser may purchase one or more slots associated with the user device 210 and/or other devices configured to receive a video stream from the streaming service 220. Subsequently, an indication that a particular video advertisement is to be included in one of more of the slots 112-116, 122-126, 132-136 is provided to the streaming service 220. The process of the streaming service 220 making a slot available for purchase and the advertiser purchasing the slot via the ad exchange 230 may occur after the user device 210 has requested to view a particular program.

As mentioned above, some exemplary embodiments may relate to the HLS protocol. The HLS protocol for a VOD stream may require that the program content and the dynamic content (e.g., video advertisements, etc.) are known before playback of the VOD stream may begin at the user device. To provide an example within the context of the video stream 102, the streaming service may select dynamic content (e.g., video advertisements, etc.) for the DCIOs 110, 120, 130 and incorporate the dynamic content into the video stream 102 before playback of the video stream 102 may begin at the user device.

In contrast to the HLS protocol for the VOD stream, the HLS protocol for an event stream may grow incrementally. For instance, a first portion of the video stream 102 may be sent to the user device 210 at a first time. Subsequently, a second portion of the video stream 102 that includes more than the first portion of the video stream 102 may be sent at a second time. Further portions of the video stream 102 may be provided in this manner in accordance with the HLS protocol for the event stream. As will be described below, the exemplary embodiments may provide VOD content in accordance with both the HLS protocol for VOD streams and the HLS protocol for event streams. Since HLS protocol for event streams do not require more than a portion of the video stream to be known before playback can begin, the process of fetching and incorporating dynamic content (e.g., video advertisements, etc.) into the video stream may be performed after playback begins. Thus, by utilizing HLS protocol for event streams to provide at least a portion of VOD content, the streaming service 220 may provide fast video stream startup at the user device 210 and comply with HLS protocols.

As mentioned above, the exemplary embodiments are not limited to HLS and may apply to other protocols such as, but not limited to, DASH, adobe flash streaming, smooth streaming, MP4 faststart, etc. Those skilled in the art will understand how the exemplary concepts described with regard to an example that includes HLS may apply to other types of streaming protocols.

Initially, the method 300 will describe a general overview of how the streaming service 220 may achieve fast video stream startup at the user device. A more detailed description of the components and types of signaling that may be utilized by the streaming service 220 to provide fast video stream startup is provided below with regard to signaling diagram 400 of FIG. 4.

Figure 3:
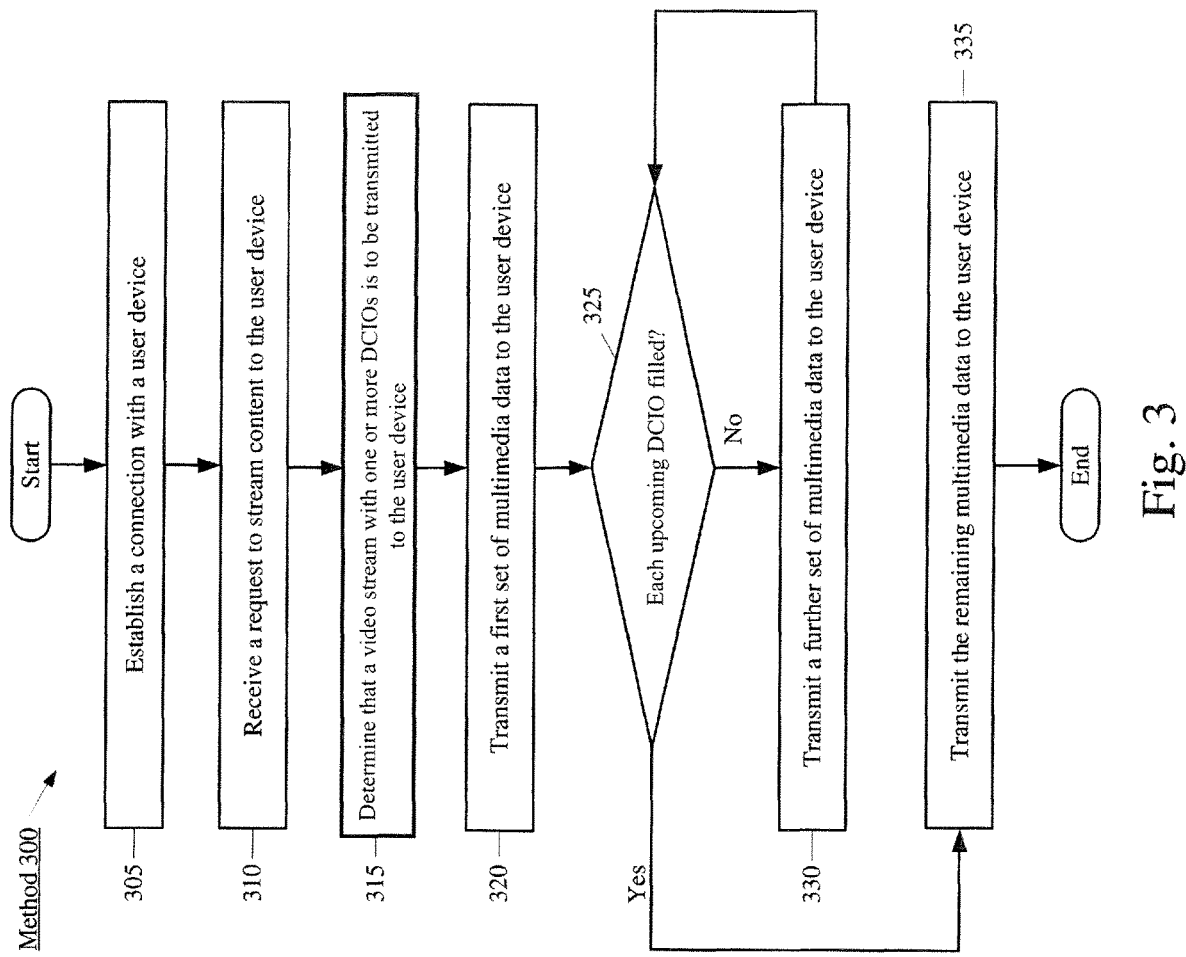
FIG. 3 shows a method for the streaming service to provide fast video stream startup according to various exemplary embodiments.

FIG. 3 shows a method 300 for the streaming service 220 to provide fast video stream startup at the user device 210 according to various exemplary embodiments. The method 300 will be described with regard to the arrangement 200 of FIG. 2.

In 305, the streaming service 220 establishes a connection with the user device 210. In one example, the user device 210 may access the streaming service 220 using a user-facing application. In another example, the user device 210 may access the streaming service 220 using a web browser. However, these examples are merely provided for illustrative purposes, how the user device 210 accesses the streaming service 220 is beyond the scope of the exemplary embodiments.

In 310, the streaming service 220 receives a request to stream content to the connected user device 210. For example, user input at the user device 210 may indicate to the streaming service 220 that a particular program (e.g., movie, show, clip, etc.) has been selected from a video library to be provided on demand.

In 315, the streaming service 220 determines that a video stream with one or more DCIOs is to be provided to the user device 210. For example, in response to the request, the streaming service 220 may determine that the video stream 102 is to be provided to the user device 210.

In 320, the streaming service 220 transmits a first set of the multimedia data to the user device 210. In some embodiments, the first set of multimedia data may represent all of the multimedia data for the first subclip 140. In other embodiments, the first set of multimedia data may represent a portion of the multimedia data for the first subclip 140. For instance, the streaming service 220 may send multimedia data corresponding to a runtime of the selected content (e.g., 3 seconds, 15 seconds, 30 seconds, 1 minute, 5 minutes, 15 minutes, etc.) that is less than the runtime of the subclip 140. At the user device 210, playback may begin once the first set of the multimedia data is received and processed.

Meanwhile, the streaming service 220 may perform various operations to fill the DCIOs 110, 120, 130 of the video stream 102. For example, the streaming service 220 may gather prepaid advertisements, put one or more of the slots 112-116, 122-126, 132-136 up for auction using the ad exchange 230, gather unpaid content (e.g., highlights, news segments, advertisements, etc.). Thus, operations that may cause a delay in the startup of a VOD stream when using conventional techniques are performed by the exemplary embodiments concurrently with (or after) providing the first set of the multimedia data that may be used to begin playback of the video stream 102.

In 325, the streaming service 220 determines whether each upcoming DCIO has been filled. For example, the streaming service 220 may determine whether slots 112-116 of DCIO 110 have been filled with dynamic content, slots 222-226 of DCIO 120 have been filled with dynamic content and slots 332-336 of DCIO 130 have been filled with dynamic content. However, the specific operations and factors used by the streaming service 220 to fill a DCIO is beyond the scope of the exemplary embodiments. The exemplary embodiments are concerned with filling the DCIOs in a manner that does not unreasonably delay video stream startup at the user device 210 and may apply to the streaming service 220 utilizing any appropriate techniques to fill DCIOs with paid or unpaid dynamic content.

If all of the upcoming DCIOs have not been filled, the method 300 continues to 330. In 330, the streaming service 220 transmits a further set of multimedia data to the user device 210. The contents of the further set of multimedia data may depend on contents of the first set of multimedia data sent in 320 and the status of the upcoming DCIO. For example, if the first set of multimedia data sent in 320 represents all of subclip 140 and the DCIO 110 has been filled (completely or partially), in 330, the streaming service 220 may transmit the multimedia data for the dynamic content included in the DCIO 110 and at least a portion of the multimedia data for the second subclip 150. In another example, if the first set of multimedia data sent in 320 includes all of subclip 140 and none of the slots 112-116 of the DCIO 110 have been filled, in 330, the streaming service 220 may decide to skip the DCIO 110 and transmit at least a portion of the second subclip 150.

To provide another example, consider a scenario in which subclip 140 has a runtime of five minutes and multimedia data corresponding to ten seconds of subclip 140 was transmitted in 320. If the DCIO 110 has been filled, in 330, the streaming service 220 may transmit the multimedia data representing the remaining portion of subclip 140, the dynamic content of DCIO 110 and at least a portion of the second subclip 150. If the DCIO 110 has not been filled, in 330, the streaming service 220 may transmit multimedia data representing a further portion of subclip 140. This provides the streaming service 220 with more time to fill the DCIO 110 without causing a delay in playback at the user device 210.

In some embodiments, the further set of multimedia data transmitted in 330 may also include the first set of multimedia data transmitted in 320. This may be done to ensure that transport controls (rewind, pause, fast forward, etc.) can be used at the user device 210 for the video stream 102. In other embodiments, the further set of multimedia data transmitted in 330 may be combined with the first set of multimedia data transmitted in 320 at the user device 210.

Regardless of how the streaming service 220 decides to proceed in 330, the method 300 returns to 325 where the streaming service 220 determines whether all of the upcoming DCIOs are filled. 325-330 may be repeated multiple times throughout the presentation of the video stream 102 at the user device 210. As mentioned above, the contents of the further set of multimedia data may depend on contents of the first set of multimedia data sent in 320 and the status of the upcoming DCIO. Thus, the manner in which the streaming service 220 determines how to proceed at 330 may be different each time 330 is performed during the presentation of the video stream 102.

Returning to 325, if all of the upcoming DCIOs are filled, the method 300 may continue to 335. In 335, the remaining multimedia data is sent to the user device 210. In some embodiments, the determination in 325 may be based on a predetermined condition. For example, a time out parameter may be set and if all the upcoming DCIOs are not filled before the expiration of the time out parameter, the streaming service 220 may proceed to 335 without filling each slot of every upcoming DCIO. Other factors may also be considered, such as, but not limited to, the revenue expected to be generated by the video stream 102 and the total number of instances of dynamic content scheduled for the video stream 102. Thus, the streaming service 220 may also implement predetermined thresholds and if the revenue expected to be generated or the number of instances of dynamic content scheduled to be included exceeds a threshold, the streaming service 220 may proceed to 335 without filling each slot of every upcoming DCIO. Accordingly, in 325 a predetermined condition based on any appropriate one or more factors may be used.

To provide an example of 335, if the entirety of the subclip 140 was provided to the user device 210 in 320, in 335, multimedia data corresponding to at least the DCIO 110, subclip 150, DCIO 120, subclip 160, DCIO 130 and subclip 170 may be transmitted to the user device 210. To provide another example, if 5 seconds of the subclip 140 was provided to the user device 210 in 320, in 335, multimedia data corresponding to at least the remaining portion of subclip 140, DCIO 110, subclip 150, DCIO 120, subclip 160, DCIO 130 and subclip 170 may be transmitted to the user device 210.

In some embodiments, the multimedia data transmitted in 335 may also include the first set of multimedia data transmitted in 320 (and any multimedia data transmitted in 325). This may be done to ensure that transport controls (rewind, pause, fast forward, etc.) can be used at the user device 210 on the video stream 102. In other embodiments, the multimedia data transmitted in 330 may not include the multimedia data transmitted in 320. Instead, the user device 210 may combine the multimedia data transmitted in 335 with the first set of multimedia data transmitted in 320 (and any multimedia data transmitted in 325).

Figure 4:
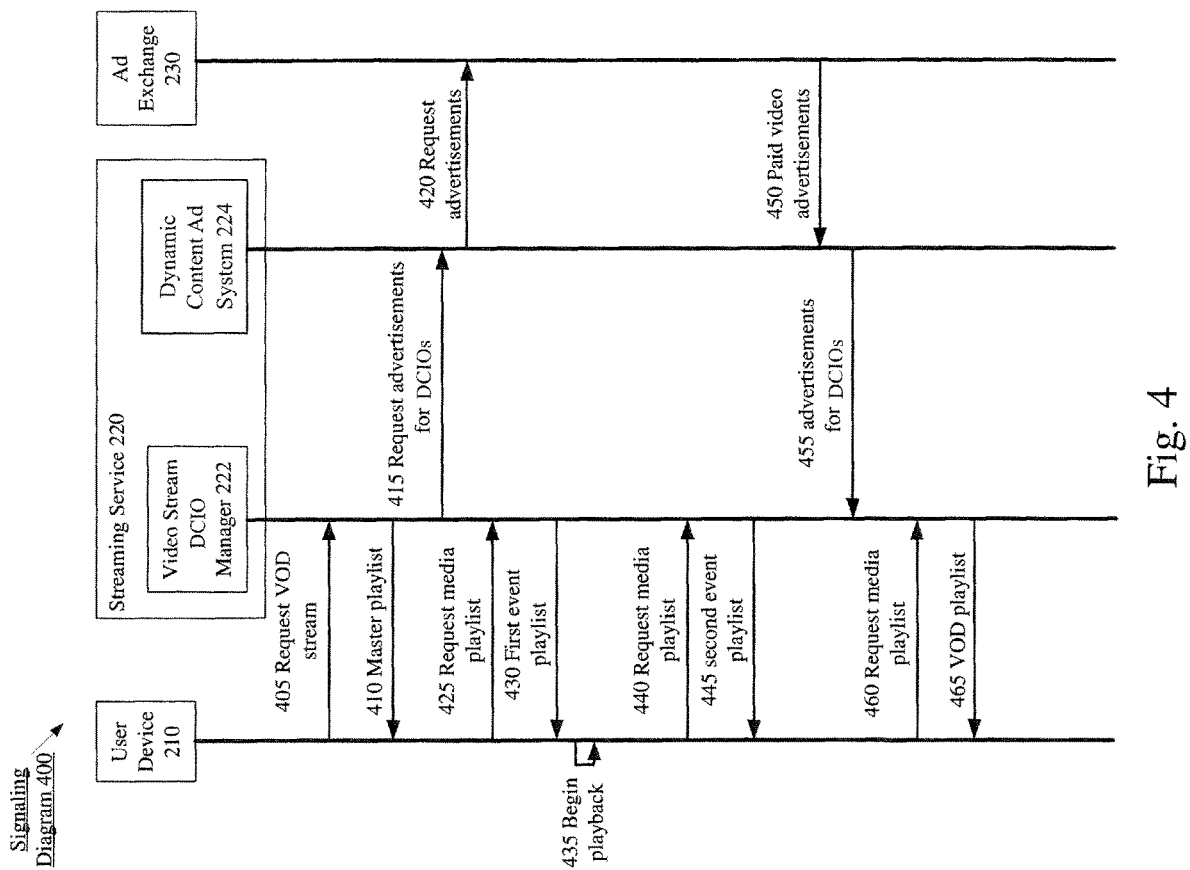
FIG. 4 shows a signaling diagram for how various exemplary components of the streaming service may provide fast video stream startup at the user device according to various exemplary embodiments.

FIG. 4 shows a signaling diagram 400 for how various exemplary components of the streaming service 220 may provide fast video stream startup at the user device 210 according to various exemplary embodiments. The signaling diagram 400 will be described with regard to the video stream 102 of FIG. 1 and the arrangement 200 of FIG. 2.

The signaling diagram 400 shows the user device 210, the streaming service 220 and the ad exchange 230. The streaming service 220 is shown as including a video stream DCIO manager 222 and a dynamic content system 224. The video stream DCIO manager 222 may represent software and/or firmware configured to perform operations related to DCIOs that are to be included in a video stream. For example, when the streaming service 220 determines that the video stream 102 is to be provided to the user device 210, the video stream DCIO manager 222 may determine the duration of the DCIOs, 110, 120, 130 and communicate with various sources to fill the DCIOs 110, 120, 130.

The dynamic content system 224 may include various hardware, software and/or firmware components related to filling DCIOs with dynamic content. The dynamic content system 224 may communicate with the video stream DCIO manager 222. For example, the dynamic content system 224 may receive a request from the video stream DCIO manager 222 indicating that DCIOs 110, 120, 130 are available to be filled with dynamic content. The dynamic content system 224 may also communicate with the ad exchange 230. For example, the dynamic content system 224 may indicate to the ad exchange 230 that slots are available to purchase. In response, the dynamic content system 224 may receive an indication that an advertiser has purchased one or more slots.

As will be shown below, the signaling diagram 400 will be described with regard to HLS protocols. To provide fast video stream startup and comply with HLS protocols, the streaming service 220 may initially send an event stream to the user device 210 which may then be converted to a VOD stream. This process will be described with regard to filling the DCIOs 110, 120, 130. However, as mentioned above, the exemplary embodiments are not limited to filling DCIOs in any particular manner.

In 405, the user device 210 transmits a request to the video stream DCIO manager 222 for a VOD stream. For example, user input at the user device 210 may indicate to the streaming service 220 that the user is requesting to view a program that is available on demand.

In 410, the video stream DCIO manager 222 transmits a master playlist to the user device 210 in response to the request. As mentioned above, the exemplary embodiments may relate to HLS protocols. Those skilled in the art will understand that a master playlist is an aspect of the HLS protocol and describes attributes associated with the video stream. For example, the master playlist may provide access to a set of variant streams each of which describe a different version of the same content (e.g., different resolutions and/or encoding rates). This information is provided to the video player of the user device 210 and may be used by the video player to dynamically switch to the most appropriate variant stream in view of the measured network bitrate.

In 415, the video stream DCIO manager 222 transmits a request to the dynamic content system 224 to fill the DCIOs that are to be provided to the user device 210. For example, the request may indicate that DCIOs 110, 120, 130 are available to be filled with dynamic content.

In 420, the dynamic content system 224 transmits a request to the ad exchange 230 for paid advertisements. This request may include an indication that DCIOs are available in a stream that is to be provided to the user device 210. The request may be for targeted and/or untargeted ads. Thus, the request may also include information corresponding to the user and/or the user device 210.

In some embodiments, the request may correspond to all of the DCIOs 110, 120, 130. This request may be associated with a timeout parameter and if a response to the request is not received before the timeout parameter expires, the request is canceled and the video stream 102 may be provided without any ads. In other embodiments, multiple requests may be utilized, and each request may be associated with its own respective timeout parameter.

In 425, the user device 210 transmits a request to the video stream DCIO manager 222 for a media playlist. Like the master playlist, the media playlist is also an aspect of the HLS protocol. The media playlist may correspond to a set of multimedia data that is to be played by the video player running on the user device 210.

In this example, when this request is received, the video stream DCIO manager 222 does not know the dynamic content that is to be incorporated into the video stream 102. As will be described in more detail below, instead of waiting for the dynamic content system 224 to fill the DCIOs 110, 120, 130 and increasing the duration of video stream startup at the user device 210, the video stream DCIO manager 222 may send a playlist corresponding to a portion of the multimedia data to the user device 210 so that playback of the selected program can begin at the user device 210.

In 430, the video stream DCIO manager 222 transmits a first event playlist to the user device 210. In one example, the first event playlist may include multimedia data for a portion of subclip 140 (e.g., n seconds or minutes of playback). In another example, the first event playlist may correspond to all of the multimedia data for subclip 140. Accordingly, in response to a request for a VOD stream, the exemplary embodiments may initially transmit a playlist for an event stream.

In 435, the playback begins at the user device 210 using the first event playlist. By using an event playlist while the dynamic content system 224 retrieves ads for the DCIOs 110, 120, 130, playback can begin before the ads are retrieved. Thus, compared to conventional techniques that only utilize a VOD playlist, the exemplary embodiments provide a faster video stream startup.

In 440, the user device 210 transmits a request for a media playlist. For example, as the video player of the user device 210 executes the multimedia data corresponding to the first event playlist, the user device 210 may be triggered to request more content.

In 445, the video stream DCIO manager 222 transmits a second event playlist to the user device 210. The second event playlist may correspond to the multimedia data included in the first event playlist and an additional set of multimedia data.

In the example of the signaling diagram 400, the second event playlist corresponds to a portion of the subclip 140. However, as indicated in 325-330 of the method 300, the amount of multimedia data in the second event playlist may be based on any of a plurality of factors. For example, if multimedia data corresponding to n seconds of subclip 140 was provided in the first event playlist and the dynamic content system 224 has not indicated that the DCIO 110 has been at least partially filled, the video DCIO manager 222 may provide multimedia data corresponding to the n seconds of subclip 140 plus m seconds of subclip 140. In another example, if multimedia data corresponding to the entirety of subclip 140 was provided in the first event playlist and the dynamic content system 224 has not indicated that the DCIO 110 has been at least partially filled, the streaming service 220 may skip the first DCIO and provide multimedia data corresponding to subclip 140 and at least a portion of subclip 150. These examples are only provided for illustrative purposes and are not intended to limit the exemplary embodiments in any way. The exemplary embodiments may apply to providing any number of event playlists corresponding to any amount of multimedia data.

In 450, the ad exchange 230 indicates to the dynamic content system 224 that advertisers have paid for video advertisements to be included in the video stream 102. In 455, the dynamic content system 224 indicates to the video stream DCIO manager 222 that the DCIOs 110, 120, 130 are to be filled with the video advertisements received from the ad exchange 230.

In 460, the user device 210 transmits a request for a media playlist. For example, as the video player of the user device 210 executes the multimedia data corresponding to the second event playlist, the user device 210 may be triggered to request more content corresponding to the selected VOD program.

In 465, the video stream DCIO manager 222 transmits a VOD playlist to the user device 210. The VOD playlist may correspond to multimedia data for subclip 140, DCIO 110, subclip 150, DCIO 120, subclip 160, DCIO 130 and subclip 170. Accordingly, to ensure that the streaming service 220 provides fast video stream startup while operating in accordance with HLS protocol, the streaming service 220 may initially provide one or more event playlists in response to a request for VOD content. Subsequently, the event stream may be converted into a VOD stream. From the perspective of the HLS protocol, the conversion may be facilitated by including a tag in the VOD playlist that indicates to the video player of the user device 210 that the continuous request for event playlists may be terminated.

As indicated in 325-335 of the method 300, a second event playlist may not be transmitted. That is, the streaming service 220 may decide to provide the VOD playlist after transmitting the first event playlist. This decision may be based on any of a variety of different factors including, but not limited to, receiving an indication that the DCIOs 110, 120, 130 have been filled, the expiration of a timer, an estimated revenue, receiving an indication that a predetermined number of video advertisements are scheduled to be included in the video stream 102, etc.

There may be scenarios in which the streaming service 220 may want to allow the user to start the VOD stream from a point that is not the beginning of the stream. For instance, the user may have previously watched a portion of the VOD content. The streaming service 220 may want to allow the user to resume a VOD stream from its last played position. In this type of scenario, the first event playlist may exclude any preceding DCIO. For example, if the user previously watched the selected VOD content up until a point configured to occur during subclip 150, the streaming service 220 may configure the first event playlist to correspond to the entirety of subclip 140 and a portion of subclip 150 while excluding the DCIO 110. In another example, if the user previously watched the selected VOD content up until a point configured to occur during subclip 156, the streaming service 220 may configure the first event playlist to correspond to the entirety of subclip 140, the entirety of subclip 150 and a portion of subclip 160 while excluding the DCIOs 110, 120. Excluding the DCIOs in this type of scenario ensure fast video stream startup (at the resume point) without impeding the use of transport controls.

Continuing with the above scenario, there may be instances in which the duration of time between the resume point and the next upcoming DCIO is not enough time for the dynamic content system 224 to fill an DCIO. To account for these edge use cases, in some embodiments, if the resume point is located within a predetermined duration of the upcoming DCIO, the upcoming DCIO may also be excluded from the event playlist. Alternatively, if the user selects a resume point that is located within the predetermined duration, the streaming service 220 may resume the video stream 102 at a point outside of that predetermined duration.

When the event stream is being utilized, the exact duration of the DCIOs is not known because the process of filling the DCIOs has not yet been completed. Consequently, the total playback duration of the video stream 102 is also not known. To provide an adequate user experience at the user device 210, the user interface of the user device 210 may be configured to display the published duration which refers to the total time of the selected program plus the expected duration of the DCIOs 110, 120, 130. When event stream is converted to the VOD stream, the actual duration of the video stream 102 may differ from the published duration. For example, one or more DCIOs may only be partially filled relative to their predetermined duration.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    at a streaming service:
        determining that a video stream is to be provided to a user device, wherein the video stream corresponds to selected video content that is available on-demand and is configured to include multiple subclips corresponding to the selected content and a dynamic content insertion opportunity (DCIO);
        transmitting a first event playlist to the user device, wherein the first event playlist corresponds to a first portion of the selected content;
        determining whether a predetermined condition corresponding to the DCIO is satisfied;
        when the predetermined condition is not satisfied, transmitting a second event playlist to the user device corresponding at least to a second portion of the selected content; and
        when the predetermined condition is satisfied, transmitting a video playlist to the user device, wherein the video playlist corresponds at least to a third portion of the selected content and dynamic content not included in the second event playlist to be inserted in the DCIO.

2. The method of claim 1, wherein the video playlist includes multimedia data corresponding to one or more video advertisements scheduled for the DCIO.

3. The method of claim 1, wherein the first event playlist corresponds to a first set of multimedia data, the second event playlist corresponds to a second set of multimedia data, and the video playlist is a video-on-demand (VOD) playlist corresponding to a third set of multimedia data.

4. The method of claim 1, wherein the second portion of the selected content includes at least part of the first portion of the selected content and an additional portion of the selected content.

5. The method of claim 1, further comprising:
    when the predetermined condition is not satisfied, excluding the DCIO from the video stream.

6. The method of claim 1, wherein determining whether the predetermined condition is satisfied includes determining whether one or more video advertisements are scheduled for the DCIO.

7. The method of claim 1, wherein the first and second event playlists correspond to a HTTP live streaming (HLS) event protocol and wherein the video playlist corresponds to an HLS video-on-demand (VOD) protocol.

8. The method of claim 4, wherein the first and second portions of the selected content correspond to different portions of a first subclip.

9. The method of claim 6, wherein determining whether the predetermined condition is satisfied further includes determining whether a total duration of the one or more video advertisements is equal to a predetermined duration of the DCIO.

10. A server, comprising:
    a communication interface configured to provide a video stream to a user device; and
    a processor configured to perform operations, the operations comprising:
        determining that a video stream is to be provided to the user device, wherein the video stream corresponds to selected video content that is available on-demand and is configured to include multiple subclips corresponding to the selected content and a dynamic content insertion opportunity (DCIO);
        transmitting a first event playlist to the user device, wherein the first event playlist corresponds to a first portion of the selected content;
        determining whether a predetermined condition corresponding to the DCIO is satisfied;
        when the predetermined condition is not satisfied, transmitting a second event playlist to the user device corresponding at least to a second portion of the selected content; and
        when the predetermined condition is satisfied, transmitting a video playlist to the user device, wherein the video playlist corresponds at least to a third portion of the selected content and dynamic content not included in the second event playlist to be inserted in the DCIO.

11. The server of claim 10, wherein the video playlist includes multimedia data corresponding to one or more video advertisements scheduled for the DCIO.

12. The server of claim 10, wherein the first event playlist corresponds to a first set of multimedia data, the second event playlist corresponds to a second set of multimedia data, and the video playlist is a video-on-demand (VOD) playlist corresponding to a third set of multimedia data.

13. The server of claim 10, wherein the second portion of the selected content includes at least part of the first portion of the selected content and an additional portion of the selected content.

14. The server of claim 10, wherein determining whether the predetermined condition is satisfied includes determining whether one or more video advertisements are scheduled for the DCIO.

15. The server of claim 10, wherein determining whether the predetermined condition is satisfied includes determining whether a time out parameter has expired.

16. The server of claim 13, wherein the first and second portions of the selected content correspond to different portions of a first subclip.

17. The server of claim 14, wherein determining whether the predetermined condition is satisfied further includes determining whether a total duration of the one or more video advertisements is equal to a predetermined duration of the DCIO.

18. A non-transitory computer readable storage medium including a set of instructions executable by a processor, when executed the set of the instructions cause the processor to perform operations, comprising:

determining that a video stream is to be provided to a user device, wherein the video stream corresponds to selected video content that is available on-demand and is configured to include multiple subclips corresponding to the selected content and a dynamic content insertion opportunity (DCIO);

transmitting a first event playlist to the user device, wherein the first event playlist corresponds to a first portion of the selected content;

determining whether a predetermined condition corresponding to the DCIO is satisfied;

when the predetermined condition is not satisfied, transmitting a second event playlist to the user device corresponding at least to a second portion of the selected content; and when the predetermined condition is satisfied, transmitting a video playlist to the user device, wherein the video playlist corresponds at least to a third portion of the selected content and dynamic content not included in the second event playlist to be inserted in the DCIO.

\* \* \* \* \*